June 13, 1944.  H. C. GRANT, JR., ET AL  2,351,035
CUTOFF VALVE
Filed Aug. 29, 1942
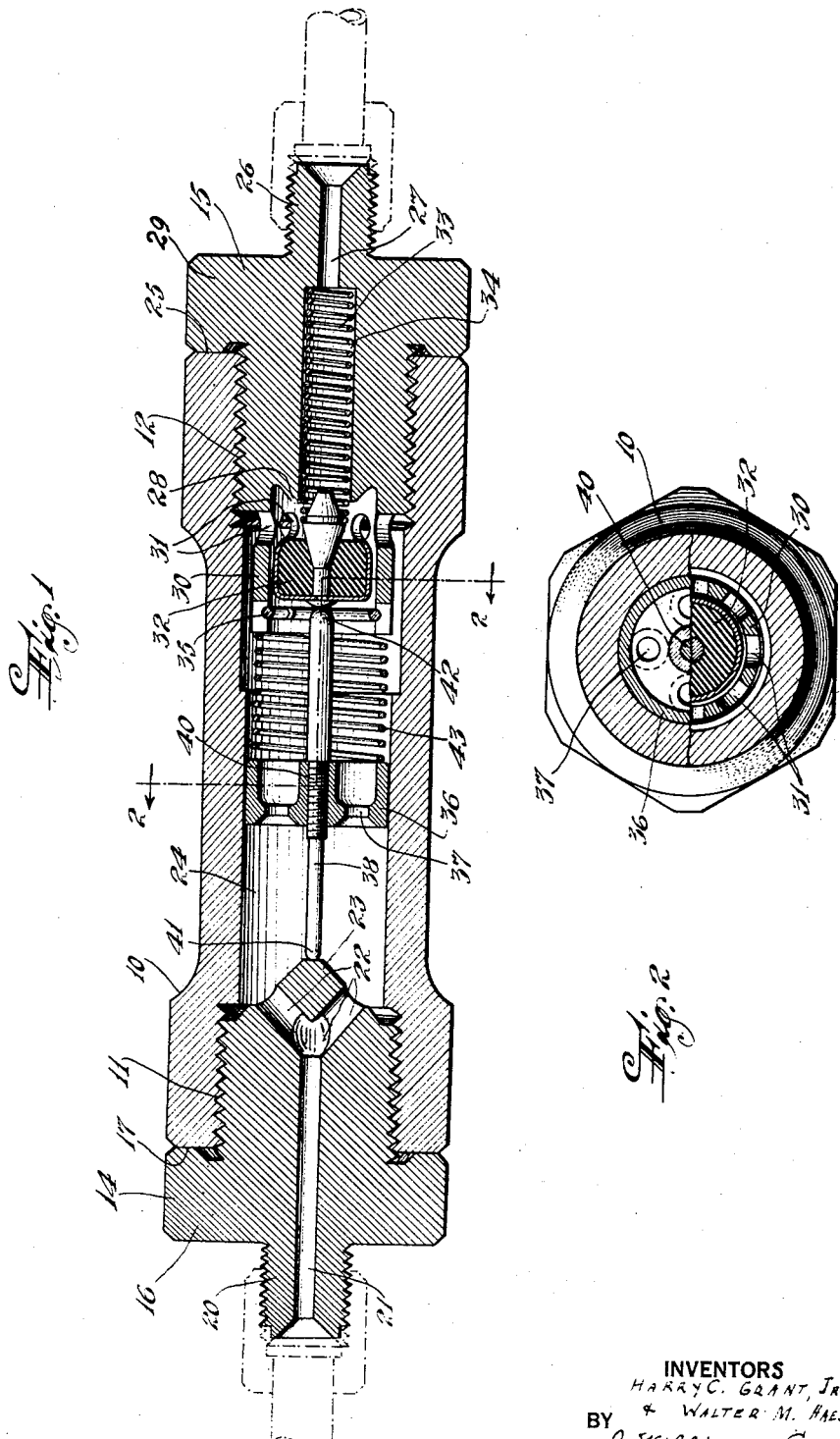
INVENTORS
HARRY C. GRANT, JR.
& WALTER M. HAESSLER.
BY J. William Carson
ATTORNEY ved June 13, 1944

2,351,035

UNITED STATES PATENT OFFICE 2,351,035

CUTOFF VALVE

Harry C. Grant, Jr., New York, N. Y., and Walter M. Haessler, Jersey City, N. J., assignors to Specialties Development Corporation, Bloomfield, N. J., a corporation of New Jersey Application August 29, 1942, Serial No. 456,614

10 Claims. (Cl. 137—153)

This invention relates to check valves, and more particularly to an automatic cut-off valve used in connection with the control of the flow of high pressure fluid media.

An object of the present invention is to provide an improved automatically acting cut-off valve for use in connection with a fluid pressure medium line which will normally remain open to permit a predetermined flow therethrough of the fluid medium; and which will automatically close by an increase of the rate of flow therethrough beyond a predetermined amount, as might be caused by a break in the line beyond the valve, thereby shutting off the flow of the fluid medium and preventing the wasteful and possibly dangerous escape of the medium through the break in the line, thereby preserving the medium and making it convenient to take the necessary measures to repair the break.

Another object of this invention is to provide a simple device for carrying out these functions, and one which is compact in construction and arranged for rapid repairs and inspection.

Other and further objects, not specifically mentioned, will be apparent when described in greater detail in connection with the accompanying drawing, wherein Figure 1 is a longitudinal cross-sectional view of the device, and Figure 2 is a cross-sectional view taken on the line 2—2 of Figure 1.

Referring to the drawing, there is shown a valve device comprising a substantially cylindrical casing or housing 10, being internally threaded at both ends as at 11 and 12. An inlet plug 14 and an outlet plug 15 is threaded into the casing at 11 and 12, respectively.

The inlet plug is formed with a large diameter portion 16 which is shaped to provide a good grip for a wrench or similar tool, and on its inner side is adapted to abut at 17 against one end of the casing 10 to form a fluid tight seal therewith. A reduced diameter portion 20 of the inlet plug is threaded exteriorly to provide a convenient means for coupling the device to a fluid medium conduit. An axially arranged inlet port or passage 21 is provided in the inlet plug and terminates in a plurality of branch ports 22, extending outwardly and at an angle with respect to the inlet port. The inlet plug is formed with a substantially conical projection 23 which extends into a chamber 24 formed in the housing 10.

The outlet plug 15, similarly to the inlet plug, is formed with an enlarged diameter portion 29, which at 25 forms a fluid tight seal with an end of the casing 10, and also has a reduced portion 26, exteriorly threaded to accommodate conduit coupling means. An axially arranged outlet port 27 in the outlet plug 15 is provided with an annular valve seat 28 at its inner end, which end is situated within a sleeve portion 30 of the plug 15, encircling the valve seat and extending inwardly into the chamber 24. The sleeve portion 30 has a plurality of circumferentially spaced apertures 31 adjacent the valve seat 28.

A disc valve 32, adapted to abut the valve seat 28 and to shut off the outlet port 27, is positioned for limited movement in a longitudinal direction in the sleeve portion 30. A relatively weak cylindrical helical spring 33, placed in a suitably recessed portion 34 of the outlet port 27, normally holds the valve off its seat.

The sleeve portion 30, at its inner end, is provided with a retaining member 35, preferably of the split or snap ring type, which is adapted to retain the valve disc 32 within the sleeve portion, thus making it a part of a complete and separately removable outlet plug assembly.

A plunger or piston 36 is slidably mounted in the chamber 24 and is furnished with a series of circumferentially spaced flow restricting apertures 37 therein, adapted to permit a measured flow of the fluid medium from the inlet toward the outlet of the device. The piston is mounted axially on a rod 38, preferably by means of threads 40 which permit relative adjustment of the piston with respect to the rod. One end of the rod abuts the apex of the conical projection 23 of the inlet plug at 41, while its other end 42 is adapted to engage the valve disc 32 and move it toward its seat 28.

The piston 36 is normally prevented from moving toward the valve disc by a cylindrical helical spring 43 having one end thereof seated on the inwardly facing end of the sleeve portion 30, and having its other end engaging the piston. The compression of the spring may be adjusted by changing the position of the piston on the rod as indicated herein.

The device is connected into a fluid conducting line or conduit, indicated in broken lines by means of the portions 20 and 26 and normally permits the flow of fluid medium under pressure through the inlet port 21 and out through the branch ports 22 into the chamber 24. It will be observed at this point, that the angularity of the branch ports 22, with respect to the main port 21, serves to guide the incoming fluid toward the inside walls of the chamber 24 in the casing

10 rather than against the piston 36 in order to avoid any possible movement of the piston due to impingement of the incoming fluid thereon. The flow of the fluid proceeds through the apertures 37 in the piston, through the apertures 31 in the sleeve portion 30 and past the valve disc 32, which is normally held unseated by its spring 33, and then flows through the outlet port 27 of the outlet plug into the delivery line shown in broken lines.

During normal flow of the fluid pressure medium, the piston 36 is urged toward the inlet side of the device by its spring 43 to cause the end 41 of the rod to abut the projection 23 of the inlet plug. When the rod is in this position, the valve disc is urged off its seat toward the other end 42 of the rod.

In the event the line is broken at a point beyond the outlet end of the device, the fluid medium will tend to flow through the device more rapidly than heretofore, that is, at a rate greater than a predetermined value. As a result, the pressure at the outlet side of the piston decreases sharply, whereby the velocity of the incoming fluid medium at the inlet side of the piston is effective to overcome the piston spring 43 and the valve disc spring 34 and is effective to move the piston toward the outlet end of the casing. The end 42 of the rod then engages and moves the valve disc onto its seat to shut off the flow of the medium toward the outlet port 27.

Shortly after the valve has seated, the forces acting on both sides of the piston are equalized through the apertures 37, and as a consequence the spring 43 is enabled to move the piston and the rod back toward the inlet side until the rod end 41 abuts the conical projection 23. The valve disc, however, remains seated against the force of the spring 33 due to the prevailing fluid pressure in the chamber 24.

After the broken line has been repaired, the pressure difference between the chamber 24 and the line adjacent the outlet end is substantially equalized in any suitable manner, which permits the spring 33 to unseat the valve disc 32 to restore the valve parts to their normal position.

From the foregoing description, it will be seen that the present invention provides an improved cut-off valve device adapted to be used in conduits for conducting fluid pressure media in accordance with the objects set forth hereinabove. The device is readily combinable with existing fluid flow lines and is easily installed to render such lines safe from damage and loss of fluid resulting from inadvertently escaping fluid medium.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all generic and specific features of the invention herein described, and all statements of the scope of the invention which, as a matter of language, might be said to fall therebetween.

We claim:

1. The combination with a conduit adapted to conduct fluid, of a plug interposed in said conduit and formed with a seat, a valve cooperating with said seat, a spring for normally maintaining said valve in unseated condition, fluid flow metering means in said conduit, a piston operatively associated with and adapted in conjunction with said fluid flow metering means to seat said valve in response to a greater than a predetermined rate of flow of fluid through said valve device, and a spring to normally hold said piston means out of operative engagement with said valve.

2. In combination, a valve device formed with a seat, a valve cooperating therewith, a spring for normally maintaining said valve in unseated condition, piston means having fluid flow metering apertures and adapted to seat said valve in response to a greater than a predetermined rate of flow of fluid through said valve device, and a spring to normally hold said piston means out of operative engagement with said valve.

3. In combination, a valve device formed with a seat, a valve cooperating therewith, a spring for normally maintaining said valve in unseated condition, fluid flow metering means in alignment with said valve, a piston means adapted to be actuated in response to a greater than a predetermined rate of flow of fluid through said metering means, means to actuate said valve associated with said piston means, and a spring to normally hold said last named means out of operative engagement with said valve.

4. A valve device comprising in combination, housing means formed with a chamber and a seat, a valve cooperating therewith, a spring for normally maintaining said valve in unseated condition, a piston slidably disposed in said chamber and having fluid flow metering apertures and adapted to be actuated in response to a greater than a predetermined rate of flow of fluid through said valve device, a valve actuating member associated with said piston, and a spring to normally hold said actuating member out of operative engagement with said valve.

5. A valve device comprising in combination, a housing formed with a chamber, an inlet member having a portion extending into said chamber, an outlet member having a passage and formed with a seat, a valve in said chamber cooperating with said seat, a spring supported in said outlet member for normally maintaining said valve in unseated condition, a piston in said chamber, a piston rod associated with said piston, and a spring supported by said outlet member and said piston adapted to normally maintain said piston rod out of operative engagement with said valve and in engagement with said portion extending into the chamber.

6. A valve device comprising in combination, a housing formed with a chamber, an inlet member having a portion extending into said chamber, an outlet member having a passage and formed with a seat and a sleeve portion, a valve in said chamber disposed in said sleeve portion cooperating with said seat, a spring supported in said outlet member for normally maintaining said valve in unseated condition, a valve supporting member in said sleeve portion, a piston in said chamber having fluid flow metering apertures, a piston rod threaded through said piston, and a spring supported by said sleeve portion and said piston adapted to normally maintain said piston rod out of operative engagement with said valve and in engagement with said portion extending into the chamber.

7. A valve device comprising in combination, housing means formed with a chamber and a seat, a valve cooperating therewith, a spring for normally maintaining said valve in unseated condition, a member movably disposed in said chamber for actuation of said valve, a piston secured on said member and having fluid flow metering apertures and adapted to be actuated in response to a greater than a predetermined rate of flow of fluid through said valve device, a spring to normally hold said valve actuating member out of operative engagement with said valve, and means for adjusting the tension of said last named spring associated with said piston.

8. A valve device comprising in combination, housing means formed with a chamber and a seat, a valve cooperating therewith, a spring for normally maintaining said valve in unseated condition, piston means slidably disposed in said chamber and having fluid flow metering apertures and adapted to seat said valve in response to a greater than a predetermined rate of flow of fluid through the device, a spring to normally hold said piston means out of operative engagement with said valve, and fluid inlet means for said device having port means adapted to direct the incoming fluid into a direction to avoid direct impingement of the fluid on said piston means whereby undesired actuation of said piston means is avoided.

9. A valve device comprising in combination, a housing formed with a chamber, an inlet member having a portion extending into said chamber, an outlet member having a passage and formed with a seat and a sleeve portion, fluid flow aperture means in said sleeve portion, a valve in said chamber disposed in said sleeve portion cooperating with said seat, a spring supported in said outlet member for normally maintaining said valve in an unseated condition, a valve supporting member in said sleeve portion, a piston rod threaded through said piston, and a spring supported by said sleeve portion and said piston adapted to normally maintain said piston rod out of operative engagement with said valve and in engagement with said portion extending into the chamber.

10. A valve device comprising in combination, a housing formed with a chamber, an inlet member having a portion extending into said chamber, an outlet member having a passage and formed with a seat and a sleeve portion concentric with said seat, fluid flow aperture means in said sleeve portion, a valve in said chamber disposed in said sleeve portion cooperating with said seat, a spring supported in said outlet member for normally maintaining said valve in an unseated condition, a snap ring disposed in said sleeve portion for confining said valve within said sleeve portion between said ring and said seat, a piston rod threaded through said piston, and a spring supported by said sleeve portion and said piston adapted to normally maintain said piston rod out of operative engagement with said valve and in engagement with said portion extending into the chamber.

HARRY C. GRANT, Jr.
WALTER M. HAESSLER.